(12) United States Patent
IaGrone

(10) Patent No.: US 6,816,265 B1
(45) Date of Patent: Nov. 9, 2004

(54) PASSIVE TILT CORRECTION ON TWO AXES

(75) Inventor: Marcus J. IaGrone, Cushing, OK (US)

(73) Assignee: Nomadics, Inc., Stillwater, OK (US)

( * ) Notice: Subject to any disclaimer, the term of this patent is extended or adjusted under 35 U.S.C. 154(b) by 52 days.

(21) Appl. No.: 09/933,551

(22) Filed: Aug. 20, 2001

Related U.S. Application Data

(60) Provisional application No. 60/226,633, filed on Aug. 21, 2000.

(51) Int. Cl.[7] ................................................ G01B 9/02
(52) U.S. Cl. ...................................... 356/455; 356/451
(58) Field of Search ................................ 356/451, 455, 356/FOR 108; 250/334.07, 334.08

(56) References Cited

U.S. PATENT DOCUMENTS 4,165,183 A * 8/1979 Hall et al. .................. 356/455

* cited by examiner

Primary Examiner—Samuel A. Turner
Assistant Examiner—Patrick Connolly
(74) Attorney, Agent, or Firm—Dunlap, Codding & Rogers, P.C.

(57) ABSTRACT

A tilt compensator and delay element for use in an interferometer. The interferometer can be a scanning or a non-scanning interferometer. For example, the interferometer can be a Michelson-Morley interferometer or a Mach-Zehnder interferometer having a scanning mirror. The tilt compensator and delay element removes the tilt effects of the scanning mirror in two axes. The interferometer receives light and passes the light through a beam splitter. The light passed through the beam splitter is reflected by at least two mirrors. The beam splitter and the mirrors are positioned in a first plane.

The tilt compensator and delay element of the present invention is provided with an odd number of mirrors. The odd number of mirrors includes at least three mirrors. For example, the odd number of mirrors in the tilt compensator and delay element can include three mirrors, five mirrors, seven mirrors, nine mirrors, etc. The mirrors of the tilt compensator and delay element are positioned so as to receive the light, reflect the light out of the first plane, and reflect the light back into the first plane so as to provide tilt correction and to delay the light.

14 Claims, 8 Drawing Sheets

-Prior Art-

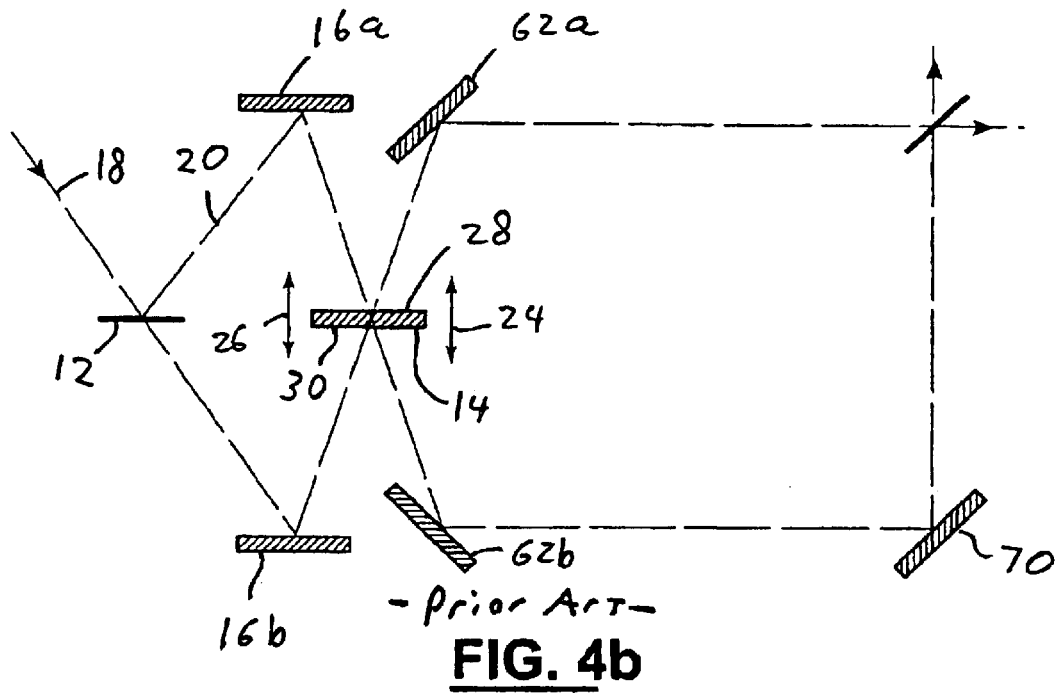
FIG. 4b — Prior Art
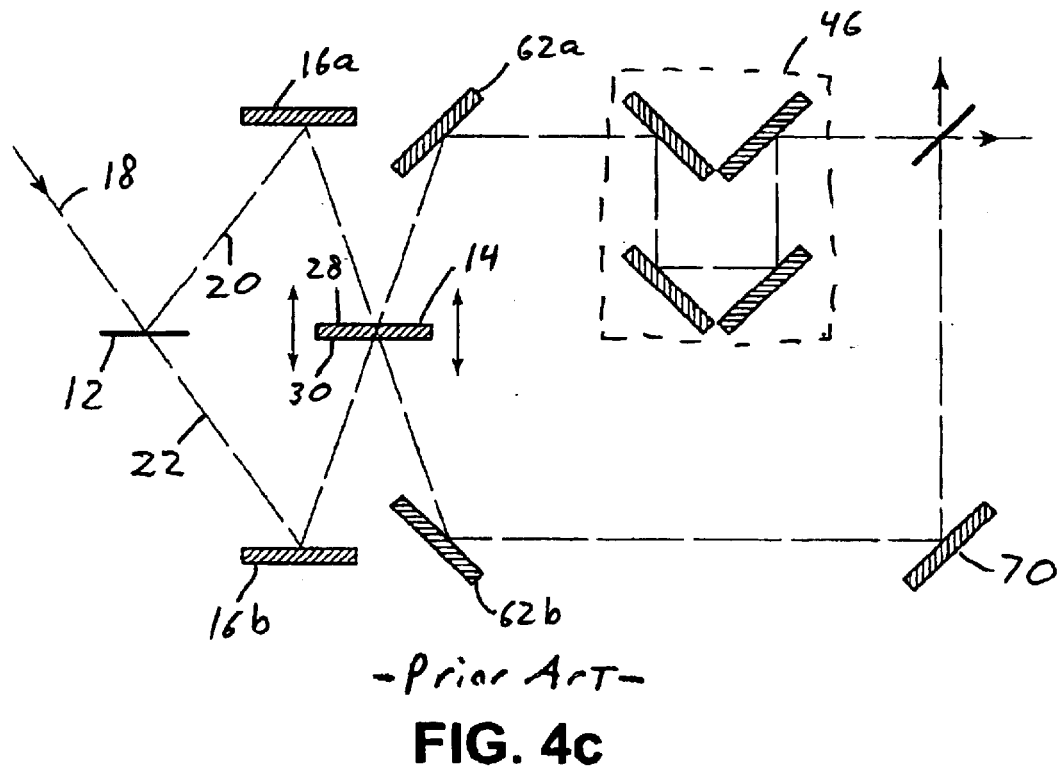
FIG. 4c — Prior Art

PASSIVE TILT CORRECTION ON TWO AXES

CROSS REFERENCE TO RELATED APPLICATIONS

The present patent application claims priority to the provisional patent application identified by U.S. Ser. No. 60/226,633 filed Aug. 21, 2000.

STATEMENT REGARDING FEDERALLY SPONSORED RESEARCH AND DEVELOPMENT

Not Applicable.

BACKGROUND OF THE INVENTION

The use of scanning interferometers is a common tool in the field of spectroscopy. By changing the path length of the arm(s) of the interferometer one can develop the Fourier spectrum of a light source and thus deduce it's spectrum. In present systems, a mirror must be carefully moved back and forth some distance and yet must maintain very high levels of tolerance in the tilt for the scanning mirror. The classical method for removing tilt effects in the scanning mirror is to use a cube corner retroreflector as the scanning element. While this style of retroreflector does eliminate the effects of tilt it does so at the expense of size and mass of the scanning element, thus limiting the speed at which it can be moved.

Other systems have been devised that can remove the effects of tilt by using a Genzel style arrangement with a "roof top" mirror. Such a system permits the scanning device to be much lighter than a cube corner retroreflector but does so at the expense of requiring either two beam-splitters or one that has a much larger area than found in an uncompensated system. There exists a need for an optical arrangement that automatically compensates for tilt of a light weight moving mirror.

SUMMARY OF THE INVENTION

The present invention provides an approach for removing the objectionable changes in the fringe pattern of the output of the interferometer system, normally caused by tilt in the scanning mirror, by carefully exploiting the nature of a Genzel arrangement of an interferometer, for example, to passively cancel the effects of tilt on the system.

BRIEF DESCRIPTION OF THE DRAWINGS

FIGS. 4a, 4b and 4c are top plan views of a 1 axis correction of Genzel Mach-Zehnder interferometers.

DETAILED DESCRIPTION OF THE PREFERRED EMBODIMENT

Figure 1:
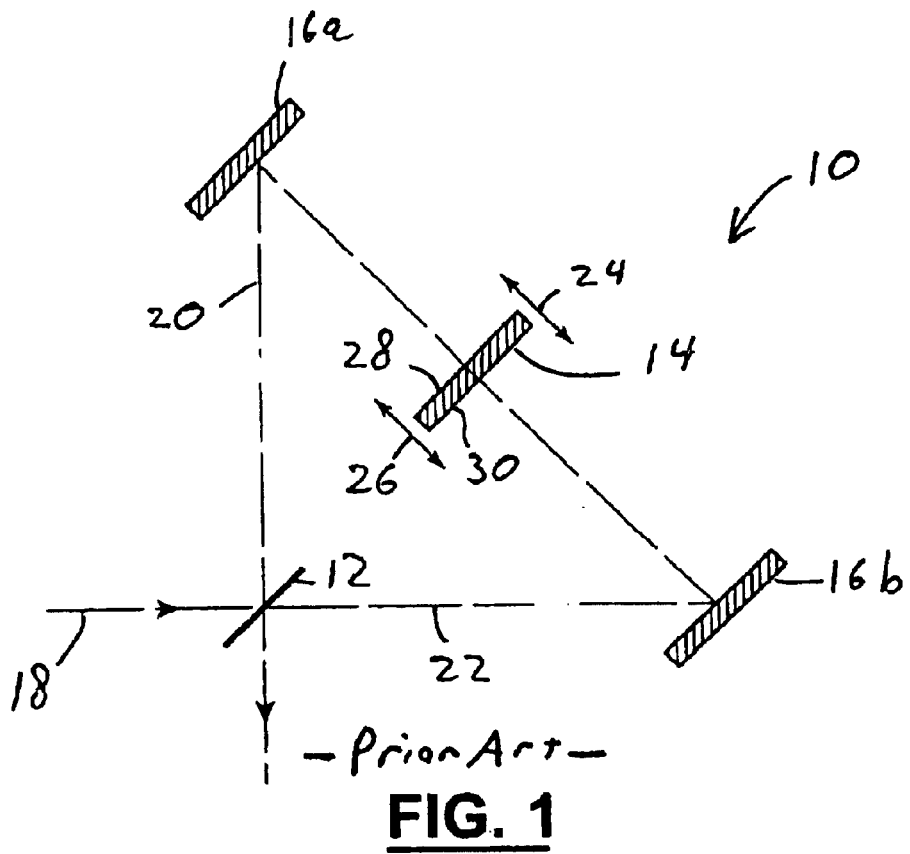
FIG. 1 is a top plan view of a Non-correcting Genzel style Michelson scanning interferometer.

Various examples of prior art interferometers in which the tilt compensator and delay element of the present invention can be used will be described hereinafter to show various applications of the tilt compensator and delay element. For purposes of brevity, similar components between the various interferometers will not be repeatedly described but will be labeled with the same reference numerals in the drawings.

Shown in FIG. 1 is an interferometer 10 having a beam splitter 12, a scanning mirror 14 and a plurality of steering mirrors 16. The interferometer 10 is a normal Genzel arrangement interferometer. The steering mirrors 16 of the Genzel arrangement interferometer 10 are labeled in FIG. 1 with the reference numerals 16a and 16b for purposes of clarity. The beam splitter 12 receives a light beam 18 and splits the light beam 18 into a first light beam 20 and a second light beam 22. The scanning mirror 14 has a sustainable oscillating movement as represented in FIG. 1 by arrows 24 and 26. The scanning mirror 14 is also provided with two reflecting sides 28 and 30. The reflecting sides 28 and 30 are planar and positioned on opposite sides of the scanning mirror 14.

The steering mirror 16a reflects the first light beam 20 to the reflecting side 28. The steering mirror 16b reflects the second light beam 22 to the reflecting side 30. The steering mirrors 16a and 16b are provided in a first plane.

In the Genzel arrangement interferometer 10, any tilt in the double-sided scanning mirror 14 causes the first and second light beams 20 and 22 to be mechanically displaced as well as undergo tilt. Since the beam is tilted in both arms of the interferometer 10 the resulting tilt is twice as severe as if the system had been a normal Michelson system.

Figure 2A:
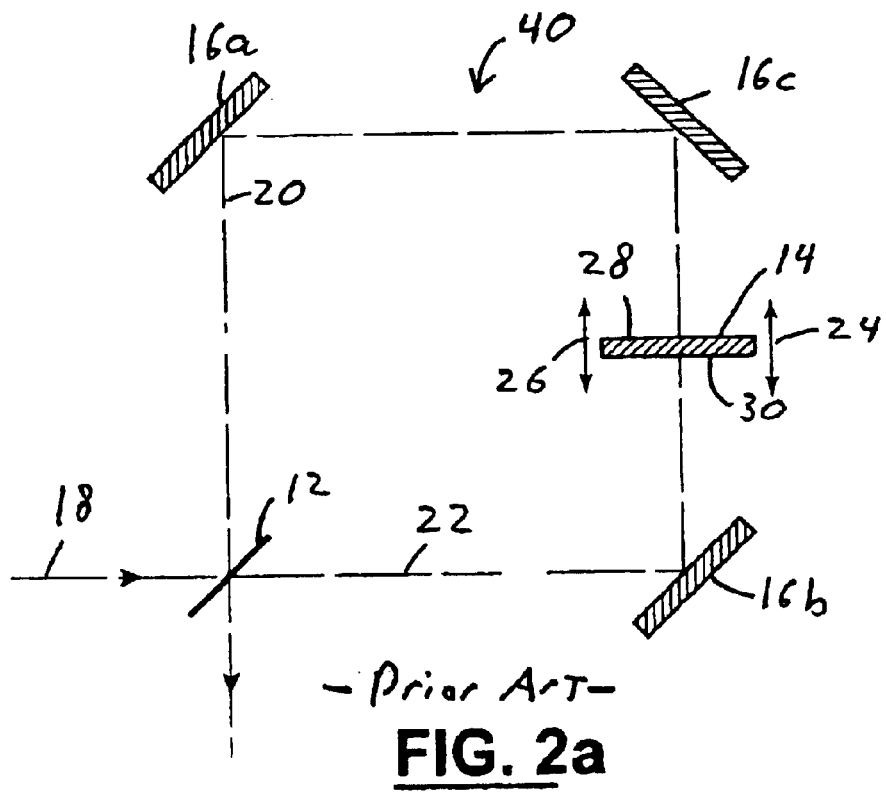
FIG. 2a is a top plan view of a 1 axis correcting Genzel Michelson scanning interferometer.

Referring now to FIG. 2a, shown therein is an interferometer 40. The interferometer 40 is known in the art as a 1 axis correcting Genzel Michelson scanning interferometer. The interferometer 40 is similar in construction and function as the interferometer 10 shown in FIG. 1, except that the interferometer 40 includes an additional steering mirror 16c positioned in an upper half or arm of the interferometer 40. As shown in FIG. 2a, by folding the first light beam 20 against the pair of mirrors 16a and 16c in the upper half and only the mirror 16b in the lower half, when the first and second light beams are tilted by the scanning mirror 14 such that the first and second light beams 20 and 22 are displaced in the plane of the interferometer 10, the first light beam 20 in the upper half has its path realigned by the pair of mirrors, 16a and 16c, such that when the first and second light beams 20 and 22 intersect at the beam splitter 12, the first and second light beams 20 and 22 have been mechanically displaced to the same point as the lower arm, and the tilt of the two intersecting wavefronts (first and second light beams 20 and 22) are tilted but are now tilted at opposite (but equal) angles to each other and thus recombine completed to form a perfect fringe.

Figure 2B:
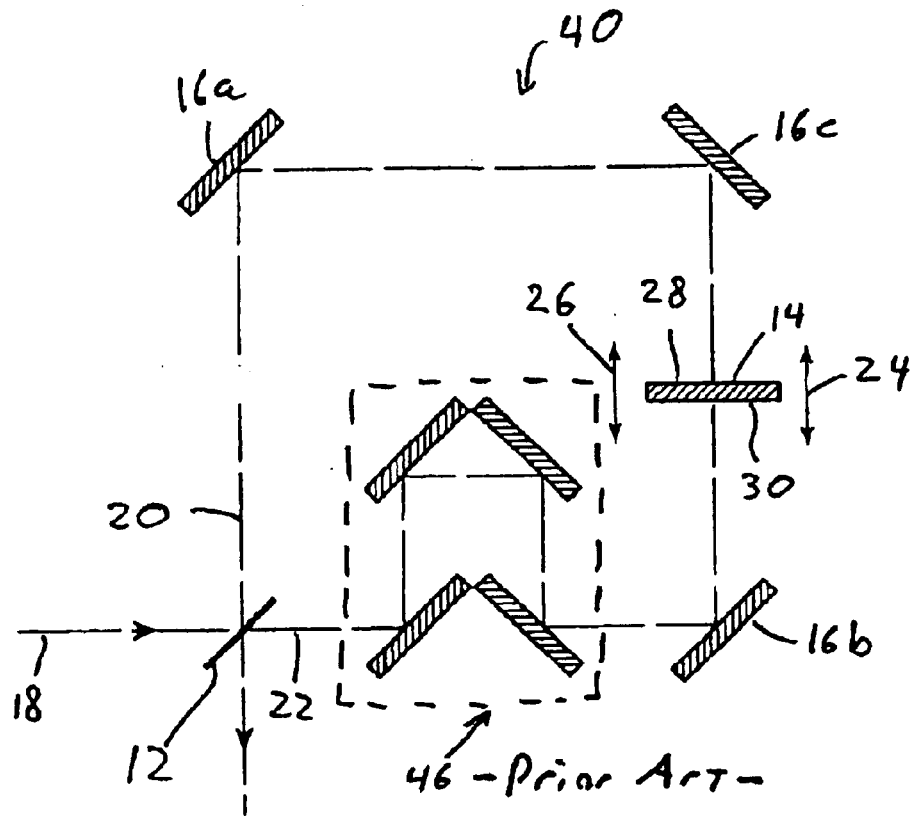
FIG. 2b is a top plan view of the 1 axis correcting Genzel Michelson depicted in FIG. 2a having a delay element of two retroreflectors in the lower arm to permit both path lengths to start at the same length which is useful if one is using polychromatic and/or non-coherent light

FIG. 2b is a top plan view of the 1 axis correcting Genzel Michelson interferometer 40 depicted in FIG. 2a having a delay element 46 of two retrorefectors in the lower arm to permit both path lengths to start at the same length which is useful if one is using polychromatic and/or non-coherent light.

The insertion of the delay element 46 is a well known system that preserves beam path and pointing characteristics and as such does not interfere with the passive tilt cancellation. In fact the delay element 48 helps assure that the spatial dislocations of the tilt is minimal.

Figure 3A:
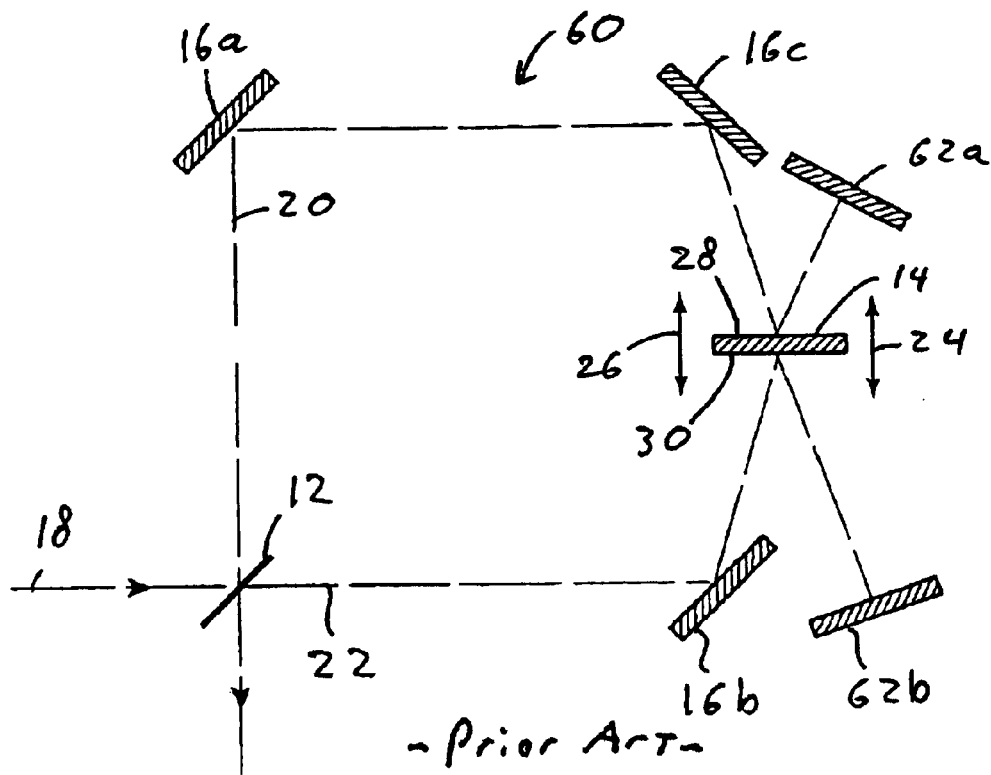
FIG. 3a is a top plan view of a 1 axis correcting double Genzel Michelson scanning interferometer.

FIG. 3a is a top plan view of an interferometer 60. The interferometer 60 is known in the art as a 1 axis correcting double Genzel Michelson scanning interferometer. The interferometer 60 is similar to the interferometer 40 shown in FIGS. 2a and 2b except that the orientations of the steering mirrors 16c and 16b are varied and the interferometer 60 includes a pair of delay mirrors 62a and 62b for causing the scanning mirror 14 to reflect the first and second light beams 20 and 22 twice on both sides, thus increasing the optical pathlength difference as the mirror 14 scans. Such a system as drawn still cancels the disruption of the fringes due to tilt along the plane of the interferometer 60. By changing the placement of the delay mirrors 62a and 62b along the beam path one can assure that the beam path in the upper and lower arms starts at the same length. Alternatively, one can insert the delay element 46 in the lower path (FIG. 3b) as was done in FIG. 2b. Once again this does not interfere with the tilt compensation along the plane of the system.

Figure 4A:
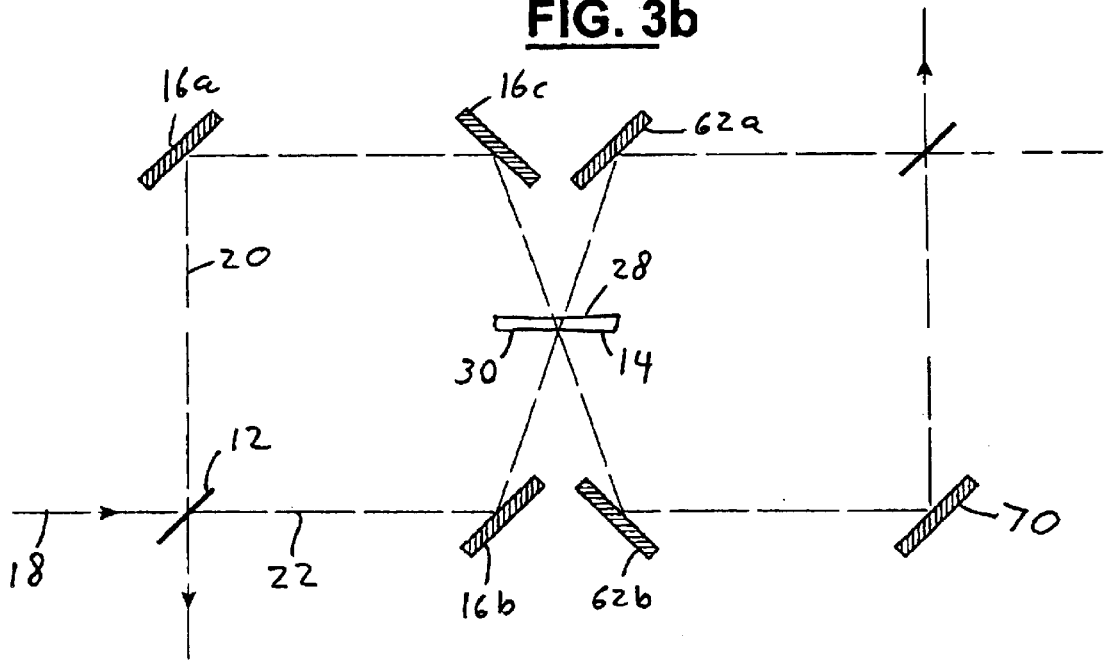

FIGS. 4a, 4b and 4c are top plan views of a 1 axis correction of Genzel Mach-Zehnder interferometers. FIGS. 4a and 4b show how the double sided "Genzel" system can be implemented in a Mach-Zehnder interferometer and remove the effects of tilt along the plane of the interferometer. In FIG. 4b, mirror 70 (M6) (M7 in FIG. 4a) is the added to reverse the direction of tilt. FIG. 4c shows the delay element 46 added.

The interferometers shown in FIGS. 2–4 only remove the effects of tilt along the plane of the interferometer, removal of the tilt effects out of the plane would also be desired (2 axes of passive tilt compensation).

The "Genzel" style geometry (FIGS. 1, 2a and b) used in many scanning interferometers has the advantage of offering twice the optical beam length change per unit that the scanning mirror 14 is displaced when compared to a simple Michelson interferometer. A "double Genzel" (FIGS. 3a and b) offers four times the displacement advantage over a Michelson interferometer. This means that the scanning mirror 14 needs to undergo a smaller (by 4x) mechanical displacement and thus could be moved with a simpler system and/or moved faster. The disadvantage of either "Genzel" approach is that the distortion in the output fringe pattern due to the tilt of the scanning mirror 14 is two (or four for the double Genzel) times worse than for a simple Michelson interferometer. This distortion results in a reduction in the signal to noise ratio at the detector which severely limits the performance of a system if it is to be used as Fourier transform spectrometer. If the scanning mirror 14 used in these "Genzel" arrangements is mechanically one piece and is double sided, it is easy to assume that the tilt on one side (e.g. reflecting side 28) of the scanning mirror 14 would be equal but opposite on the other side (e.g. reflecting side 30) of the scanning mirror 14.

This normally (FIG. 1) would result in the first and second light beams 20 and 22 separating spatially and the fringe pattern being distorted. By carefully folding one arm of the interferometer (FIGS. 2–4), one can fold the beam in the upper arm of the system such that the recombined first and second light beams 20 and 22 spatially track each other and the beam tilts (in the plane of the system) are folded so they are equal but opposite and thus recombine completely with no fringe distortion.

Figure 5:
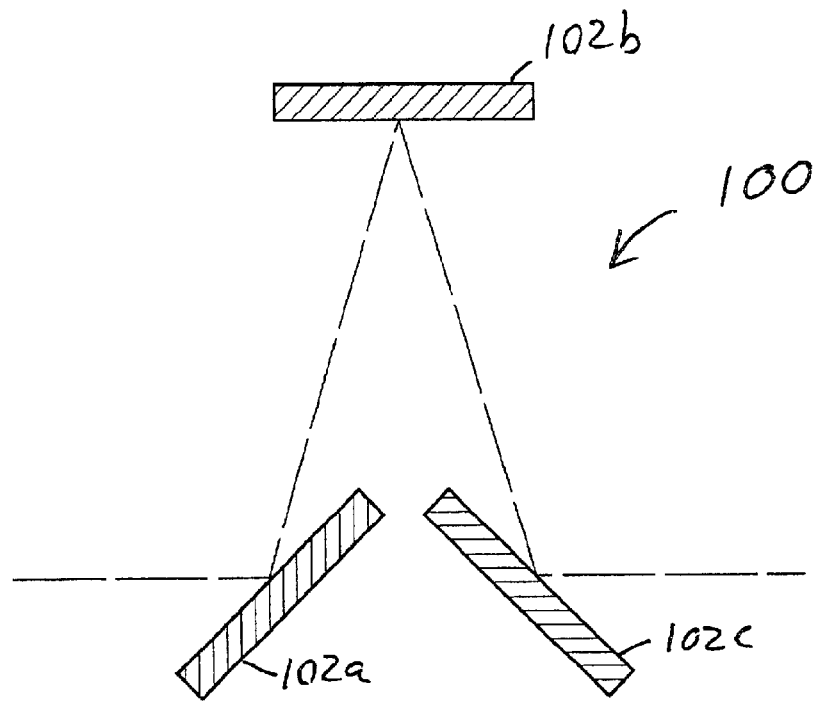
FIG. 5 is a side elevational view of a tilt compensator and delay element constructed in accordance with the present invention for performing $2^{nd}$ Axis correction and to be added to FIGS. 2-4.
Figure 6:
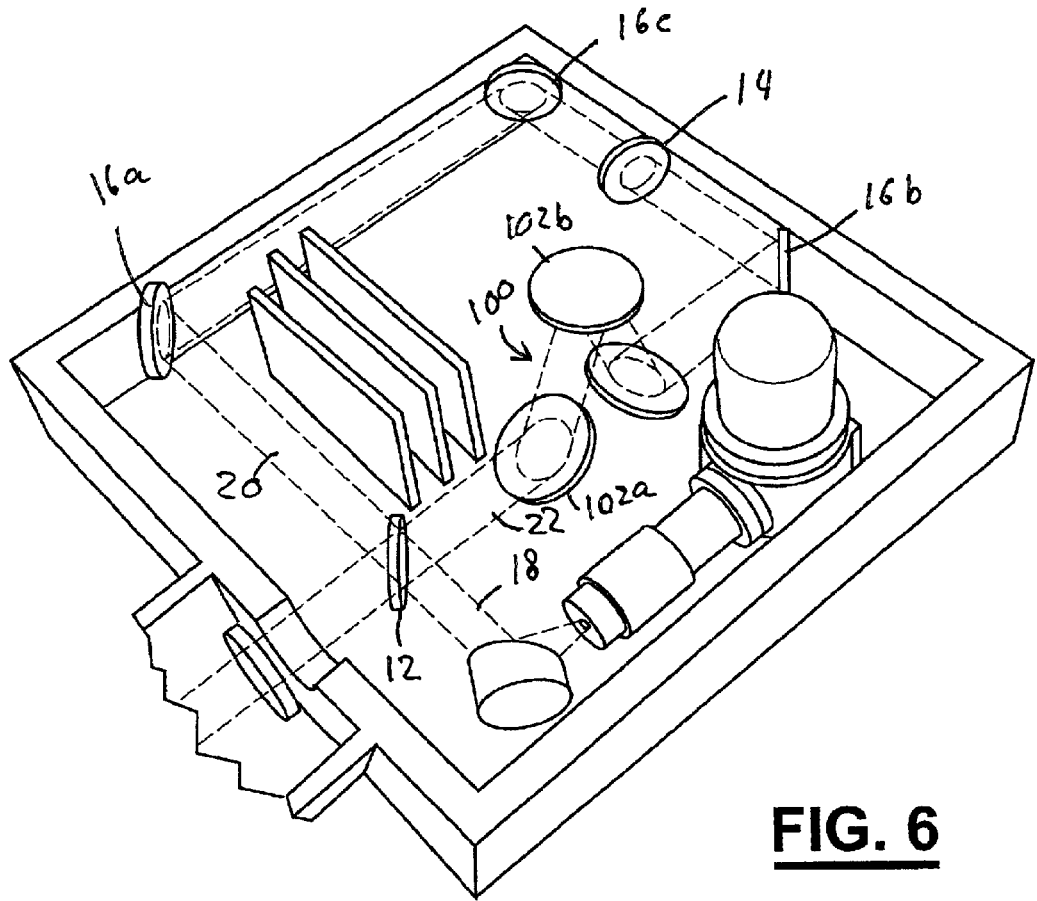
FIG. 6 is a perspective view of the 1 axis correcting Genzel Michelson having the tilt compensator and delay element of FIG. 5 in a lower arm thereof.
Figure 7:
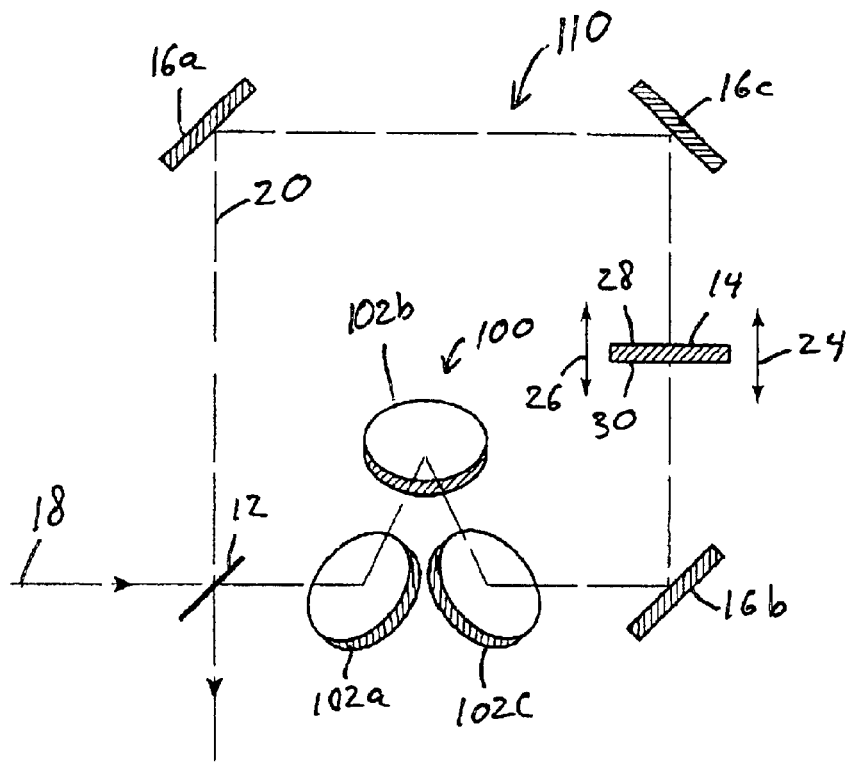
FIGS. 7–12 are partial perspective, top plan views of various interferometers constructed in accordance with the present invention.
Figure 8:
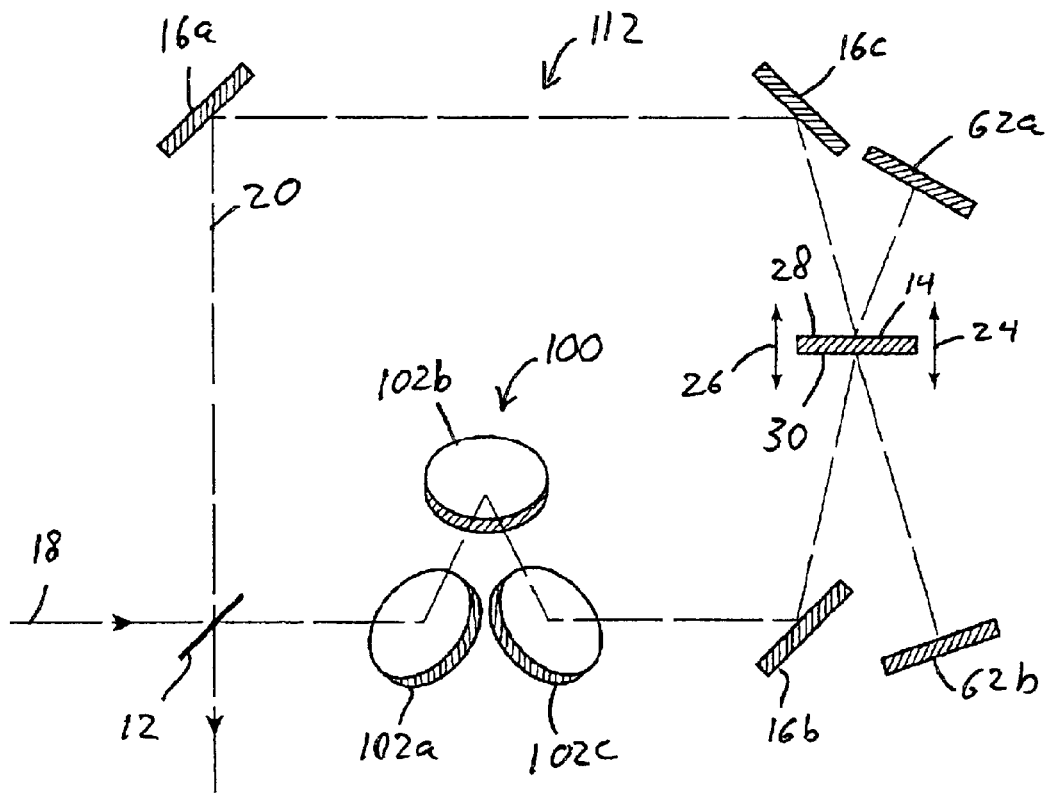
Figure 9:
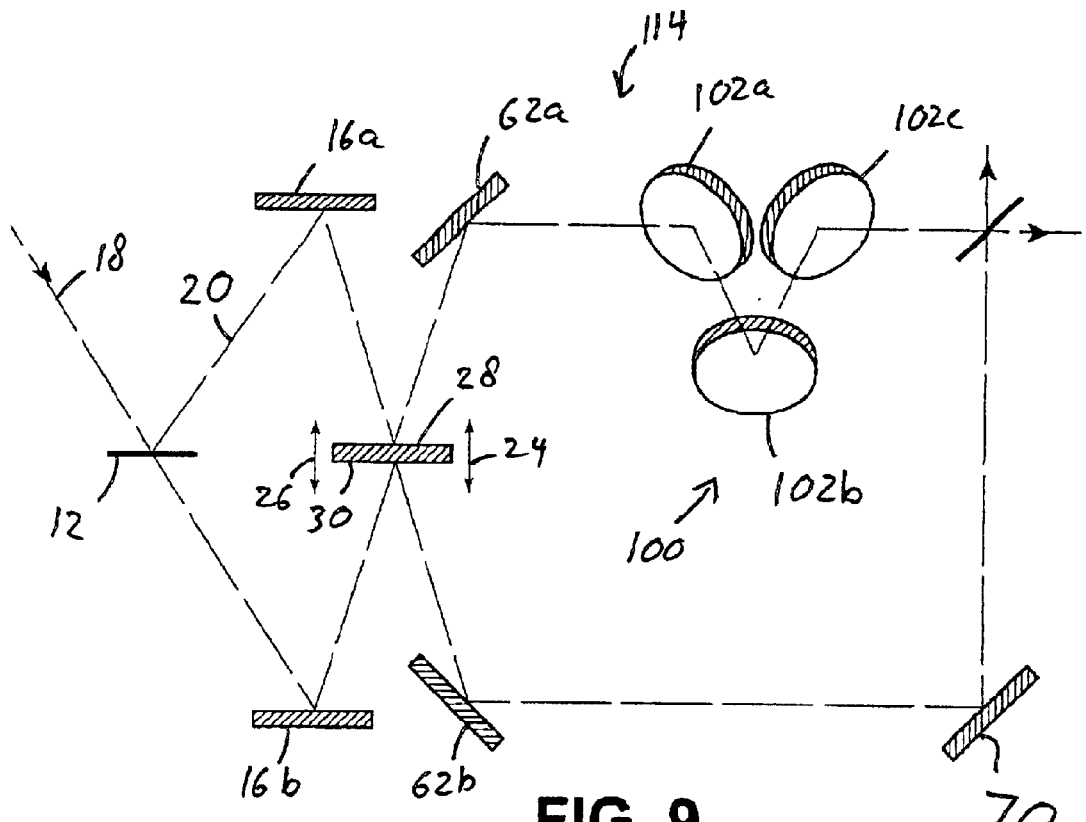
Figure 10:
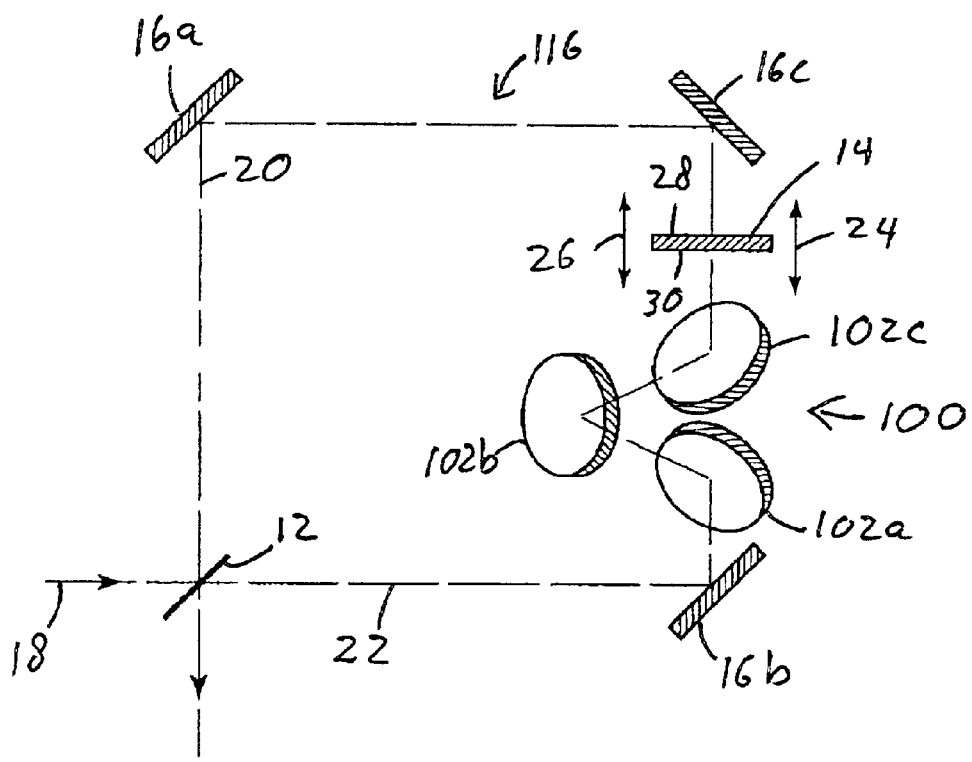
Figure 11:
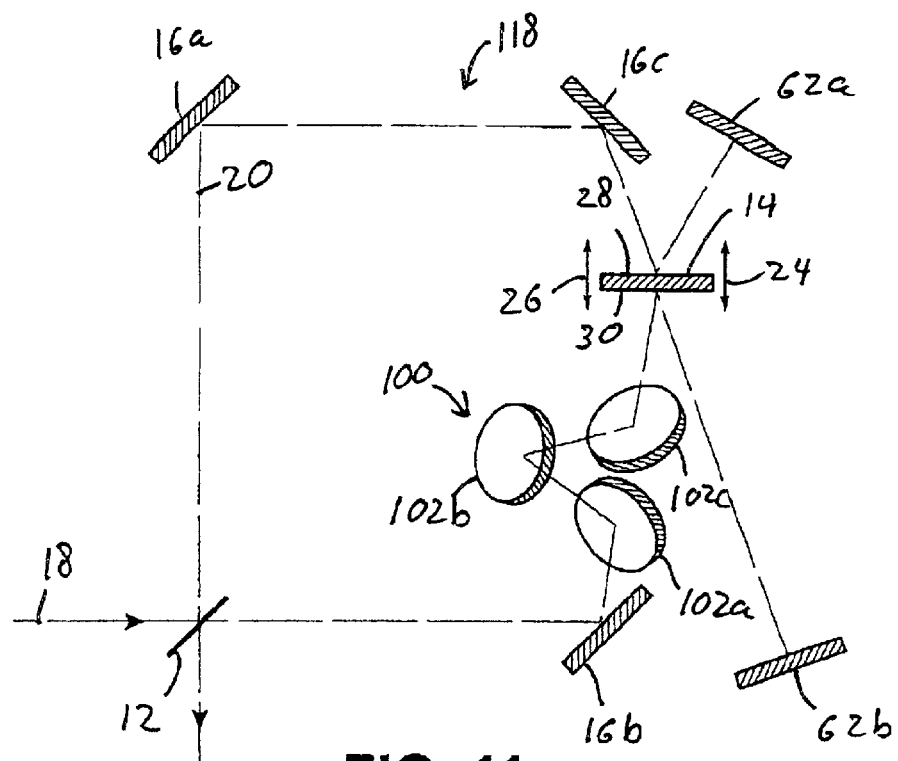
Figure 12:
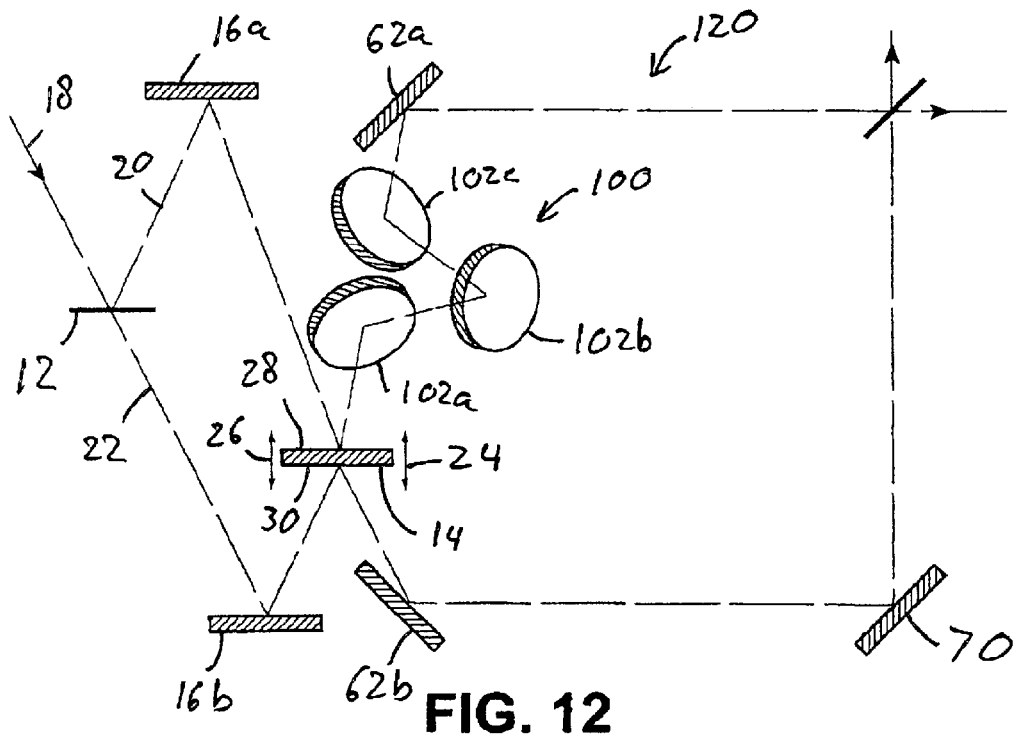

Referring now to FIGS. 5 and 6, shown therein and designated by a reference numeral 100 is a tilt compensator and delay element constructed in accordance with the present invention. As will be described in more detail below, the tilt compensator and delay element 100 can replace the prior art delay elements 46 in FIGS. 2b, 3b and 4c. The tilt compensator and delay element 100 is provided with an odd number of mirrors 102. The mirrors 102 are labeled with the reference numerals 102a, 102b and 102c for purposes of clarity. The odd number of mirrors 102 includes at least three mirrors. For example, the odd number of mirrors 102 in the tilt compensator and delay element 100 can include three mirrors, five mirrors, seven mirrors, nine mirrors, etc. The mirrors 102 of the tilt compensator and delay element 102 are positioned so as to receive the first or the second light beams 20 and 22, reflect the first or second light beams 20 and 22 out of a first plane in which the first or second light beams 20 and 22 were travelling, and reflect the first or second light beams 20 and 22 back into the first plane so as to provide tilt correction and to delay the light, as best shown in FIG. 6. The mirrors 102 of the tilt compensator and delay element 100 could be positioned to delay the first or second light beams 20 and 22 a selected amount to provide delay correction for the interferometer.

The mirrors 102 of the tilt compensator and delay element 102 can be rotated from about 1 degree up to about 90 degrees out of the plane. The tilt compensator and delay element 100 effectively folds the first or second light beam 20 and 22 so that the tilt out of the major plane is also compensated as above. The tilt compensator and delay element 100 confers an advantage roughly proportional to the SINE of the angle that the tilt compensator and delay element 100 is rotated out of the plane of the steering mirrors 16, the delay mirrors 62, the scanning mirror 14 and combinations thereof of the interferometer.

As shown in FIG. 6, the mirrors 102 of the tilt compensator and delay element 100 are rotated about 90 degrees out of the plane so that the beam is projected upwardly out of the plane. It should be understood that the mirrors 102 of the tilt compensator and delay element 100 could be positioned so that the first or second light beams 20 and 22 are projected downwardly out of the plane.

The tilt compensator and delay element 100 preserves the tilt correction in the major plane of the interferometer. Moreover, the tilt compensator and delay element 100 corrects the tilt out of the major plane. The tilt compensator and delay element 100 confers an advantage roughly proportional to the SINE of the angle that the tilt compensator and delay element 100 is rotated out of the plane of the mirrors of the interferometer.

As shown in FIG. 6, In one preferred embodiment, the tilt compensator and delay element 100 is used in combination with a scanning interferometer 106 having at least one scanning mirror 14 with two opposing planar reflecting sides 28 and 30. The tilt compensator and delay element 100 of the present invention permits the scanning mirror 14 to be made smaller, and lighter and thus substantially increases the frequency of the sustained oscillating movement of the scanning mirror 14. The scanning mirror 14 can have a sustained oscillating movement from 0 Hz to about 1 kHz.

This permits simple passive components to correct beam tilt as well as permitting the scanning mirror 14 to be a simple, low mass device. Such a tilt compensated system with a low mass scanning mirror 14 permits scanning interferometers, such as those used in FTIR, to operate at higher speeds. Referring now to FIGS. 7–12, shown therein are several examples of interferometers 110, 112, 114, 116, 118 and 120 constructed in accordance with the present invention.

The interferometer 110 is similar in construction and function as the interferometer 40 shown in FIG. 2b, except that the tilt compensator and delay element 100 has been incorporated therein in place of the delay element 46.

Figure 3B:
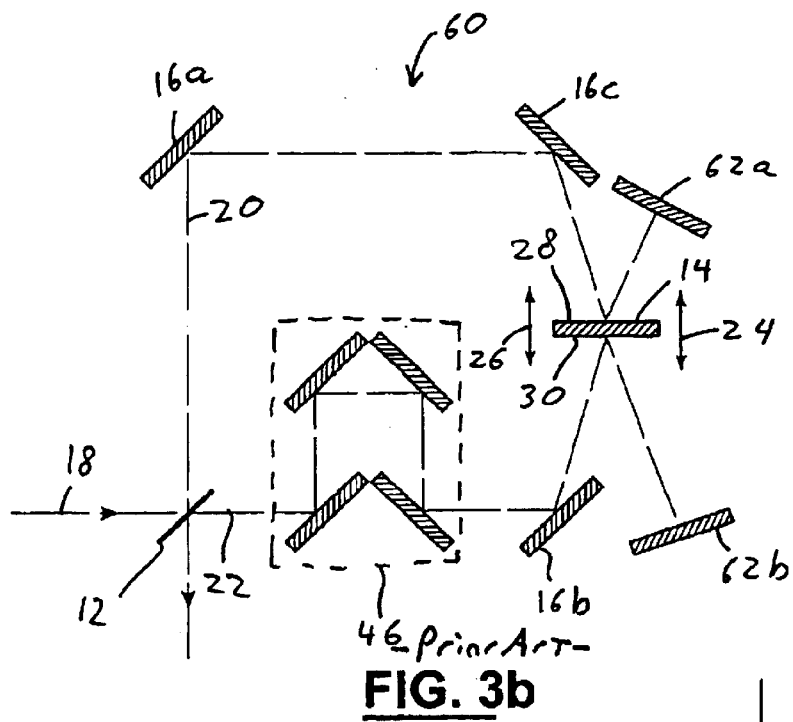
FIG. 3b is a top plan view of the 1 axis correcting double Genzel Michelson scanning interferometer of FIG. 3a having a delay element incorporated therein.

The interferometer 112 is similar in construction and function as the interferometer 60 shown in FIG. 3b, except that the tilt compensator and delay element 100 has been incorporated therein in place of the delay element 46.

The interferometer 114 is similar in construction and function as the interferometer shown in FIG. 4c, except that the tilt compensator and delay element 100 has been incorporated therein in place of the delay element 46.

The interferometers 116, 118 and 120 are similar in construction and function as the interferometers 110, 112 and 114, except that the tilt compensator and delay element 100 has been incorporated between one of the steering mirrors 16 (e.g. the steering mirror 16b) and the scanning mirror 14.

The use of interferometers, and the construction, positioning and alignment of scanning mirrors, steering mirrors, delay mirrors and other parts of the interferometers is well known in the art. Thus, no further comments are deemed necessary to teach one skilled in the art how to make or use the interferometers 110, 112, 114, 116, 118 and 120.

From the above description, it is clear that the present invention is well adapted to carry out the objects and to attain the advantages mentioned herein as well as those inherent in the invention. While presently preferred embodiments of the invention have been described for purposes of this disclosure, it will be readily understood that numerous changes may be made which will readily suggest themselves to those skilled in the art and which are accomplished within the spirit of the invention disclosed.

What is claimed is:

1. An interferometer, comprising:
    a beam splitter receiving a light beam and splitting the light beam into a first light beam and a second light beam;
    a scanning mirror having a sustainable oscillating movement, the scanning mirror having two opposing planar reflecting sides;
    a plurality of steering mirrors for reflecting the first light beam to one of the opposing planar reflecting sides, and the second light beam to the other one of the opposing planar reflecting sides, the beam splitter, scanning mirror and steering mirrors being provided in a first plane; and
    a tilt compensator and delay element having an odd number of mirrors including at least three mirrors, the mirrors being positioned to receive at least a portion of the first light beam and reflecting the first light beam out of the first plane and reflecting the first light beam back into the first plane so as to provide tilt correction and to delay the first light beam.

2. The interferometer of claim 1, wherein the tilt compensator and delay element is positioned between one of the steering mirrors and the scanning mirror.

3. The interferometer of claim 1, wherein the tilt compensator and delay element is positioned between a pair of the steering mirrors.

4. The interferometer of claim 1, wherein the interferometer is a normal Genzel arrangement interferometer.

5. The interferometer of claim 4, wherein the tilt compensator and delay element is positioned between one of the steering mirrors and the scanning mirror.

6. The interferometer of claim 4, wherein the tilt compensator and delay element is positioned between a pair of the steering mirrors.

7. The interferometer of claim 1, wherein the interferometer is a 1 axis correcting Genzel Michelson scanning interferometer.

8. The interferometer of claim 7, wherein the tilt compensator and delay element is positioned between one of the steering mirrors and the scanning mirror.

9. The interferometer of claim 7, wherein the tilt compensator and delay element is positioned between a pair of the steering mirrors.

10. The interferometer of claim 1, wherein the interferometer is a Genzel Mach-Zehnder interferometer.

11. The interferometer of claim 10, wherein the tilt compensator and delay element is positioned between one of the steering mirrors and the scanning mirror.

12. The interferometer of claim 10, wherein the tilt compensator and delay element is positioned between a pair of the steering mirrors.

13. The interferometer of claim 1, wherein the mirrors of the tilt compensator and delay element are positioned to reflect the first light beam about 90 degrees out of the first plane.

14. The interferometer of claim 1, wherein the mirrors of the tilt compensator and delay element are positioned such that the first light beam is directed out of the first plane and back into the first plane when the first light beam is traveling from the beam splitter to the scanning mirror, and the first light beam is also directed out of the first plane and back into the first plane when the first light beam is traveling from the scanning mirror to the beam splitter.

\* \* \* \* \*

UNITED STATES PATENT AND TRADEMARK OFFICE
CERTIFICATE OF CORRECTION

PATENT NO.     : 6,816,265 B1
DATED          : November 9, 2004
INVENTOR(S)    : Marcus J. la Grone It is certified that error appears in the above-identified patent and that said Letters Patent is hereby corrected as shown below:

Title page,
Item [75], Inventor, change last name from "laGrone" to -- la Grone --

Column 3,
Line 4, after the word "element" change the number "48" to the number -- 46 --

Signed and Sealed this

First Day of March, 2005

JON W. DUDAS
*Director of the United States Patent and Trademark Office*